US006950809B2

(12) United States Patent
Dahan et al.

(10) Patent No.: US 6,950,809 B2
(45) Date of Patent: Sep. 27, 2005

(54) FACILITATING A TRANSACTION IN ELECTRONIC COMMERCE

(75) Inventors: Andre Dahan, New York, NY (US); Tom Thornbury, Morganville, NJ (US); Steven Brian Harris, Briarcliff Manor, NY (US)

(73) Assignee: Dun & Bradstreet, Inc., Short Hills, NJ (US)

( * ) Notice: Subject to any disclaimer, the term of this patent is extended or adjusted under 35 U.S.C. 154(b) by 663 days.

(21) Appl. No.: 09/797,044

(22) Filed: Mar. 1, 2001

(65) Prior Publication Data

US 2001/0047343 A1 Nov. 29, 2001

Related U.S. Application Data

(60) Provisional application No. 60/186,897, filed on Mar. 3, 2000.

(51) Int. Cl.[7] .............................................. G06F 17/60

(52) U.S. Cl. ....................................................... 705/76

(58) Field of Search .............................. 705/26–27, 44, 705/64–67, 75–78; 713/155–159, 172–175, 182–186, 200–202; 235/375–382; 707/9–10

(56) References Cited

U.S. PATENT DOCUMENTS

| | | | |
|---|---|---|---|
| 5,153,898 A | 10/1992 | Suzuki et al. | |
| 5,426,281 A | 6/1995 | Abecassis | |
| 5,557,518 A | 9/1996 | Rosen | |
| 5,615,269 A | 3/1997 | Micali | |
| 5,629,982 A | 5/1997 | Micali | |
| 5,642,419 A | 6/1997 | Rosen | |
| 5,666,420 A | 9/1997 | Micali | |
| 5,671,279 A | 9/1997 | Elgamal | |
| 5,673,316 A | 9/1997 | Auerbach et al. | 380/4 |
| 5,686,728 A | 11/1997 | Shafer | |
| 5,703,949 A | 12/1997 | Rosen | |
| 5,790,677 A | 8/1998 | Fox et al. | |
| 5,794,207 A | 8/1998 | Walker et al. | |
| 5,805,798 A | 9/1998 | Kearns et al. | |
| 5,809,144 A | 9/1998 | Sirbu et al. | 380/25 |
| 5,815,310 A | 9/1998 | Williamson | |
| 5,825,881 A | 10/1998 | Colvin, Sr. | |
| 5,872,849 A | 2/1999 | Sudia | 380/49 |
| 5,878,139 A | 3/1999 | Rosen | |
| 5,892,900 A | 4/1999 | Ginter et al. | |
| 5,903,652 A | 5/1999 | Mital | 380/25 |
| 5,903,721 A | 5/1999 | Sixtus | |
| 5,903,878 A | 5/1999 | Talati et al. | |
| 5,910,988 A | 6/1999 | Ballard | 380/24 |
| 5,915,019 A | 6/1999 | Ginter et al. | |

(Continued)

FOREIGN PATENT DOCUMENTS

| | | | |
|---|---|---|---|
| EP | 0 252 734 | 1/1988 | |
| EP | 475868 A2 * | 3/1992 | G06F/15/21 |
| EP | 0 779 528 | 6/1997 | |
| EP | 0 947 882 | 10/1999 | |
| EP | 0 955 641 | 11/1999 | |
| WO | WO 99/57606 | 11/1999 | |

OTHER PUBLICATIONS

Scott, "Using Online Database for Prospect Research", Fund Raising Management v26n8 pp 44–49, Oct. 1995, ISSN: 0016–268X.*

Search Report from corresponding PCT/US01/40215 dated Sep. 5, 2001.

*Primary Examiner*—James Trammell
*Assistant Examiner*—Mary Cheung
(74) *Attorney, Agent, or Firm*—Ohlandt, Greeley, Ruggiero & Perle, L.L.P.

(57) ABSTRACT

A method for facilitating a transaction in electronic commerce, comprises the steps of identifying a first party to the transaction from a digital identifier, extracting a profile identifier of the first party from the digital identifier, and retrieving data from a database based on the profile identifier.

49 Claims, 3 Drawing Sheets

U.S. PATENT DOCUMENTS

| | | | | |
|---|---|---|---|---|
| 5,915,022 A | | 6/1999 | Robinson et al. | |
| 5,915,023 A | | 6/1999 | Bernstein | |
| 5,930,777 A | | 7/1999 | Barber | |
| 5,949,876 A | | 9/1999 | Ginter et al. | |
| 5,956,483 A | | 9/1999 | Grate et al. | |
| 5,960,430 A | * | 9/1999 | Haimowitz et al. | 707/6 |
| 5,964,831 A | | 10/1999 | Kearns et al. | |
| 5,970,472 A | | 10/1999 | Allsop et al. | |
| 5,970,475 A | | 10/1999 | Barnes et al. | |
| 5,974,146 A | | 10/1999 | Randle et al. | |
| 5,978,773 A | | 11/1999 | Hudetz et al. | |
| 5,978,840 A | | 11/1999 | Nguyen et al. | |
| 5,987,454 A | | 11/1999 | Hobbs | 707/4 |
| 6,003,014 A | * | 12/1999 | Lee et al. | 705/13 |
| 6,006,200 A | | 12/1999 | Boies et al. | |
| 6,033,079 A | | 3/2000 | Hudyma | |
| 6,198,793 B1 | | 3/2001 | Schultz et al. | |
| 6,216,115 B1 | * | 4/2001 | Barrameda et al. | 705/40 |
| 6,367,011 B1 | * | 4/2002 | Lee et al. | 713/172 |

* cited by examiner

FACILITATING A TRANSACTION IN ELECTRONIC COMMERCE

CROSS REFERENCE TO RELATED APPLICATIONS

The present application is claiming priority of U.S. Provisional Patent Application Ser. No. 60/186,897, filed on Mar. 3, 2000.

BACKGROUND OF THE INVENTION

1. Field of the Invention

The present invention relates to electronic commerce and, more particularly, to the facilitation of a transaction in electronic commerce.

2. Description of the Prior Art

Advancements in electronic communication technology, and reductions in the cost of data processing equipment have encouraged consumers, purchasing agents, merchants, suppliers, manufacturers, credit companies, banks and other institutions to expand their use of electronic commerce as a means for transacting business. In an electronic marketplace such as the Internet, parties to a transaction can exchange information in a manner, and at a rate, that is not available through other communication media. For example, a potential buyer and seller can be introduced to one another, the seller can promote its goods or services, and the buyer can select an item or service for purchase, essentially in real-time. That is, a transaction can be completed and recorded almost instantaneously.

Risks that may exist in an arms-length transaction are further exacerbated in an electronic environment, where the exchange of information is streamlined. For example, in an electronic transaction the parties often do not have an established relationship with one another, and a party might assume an alias, or take other steps to remain anonymous. Furthermore, unlike in the arms-length transaction, the true source or destination of information is often unknown to a party, and information, which may be confidential, could be acquired by a clandestine eavesdropper. Consequently, the field of electronic commerce is particularly susceptible to problems such as fraud, misrepresentation and misappropriation of confidential information.

Many organizations have taken affirmative steps to deal with these potential problems and to improve the level of confidence held by parties to such transactions. Methods have been developed to create electronic documents that are private and secure from unauthorized use. In a conventional system, an electronic document is usually converted into a secret form before transmission over a publicly accessible network. The process of converting information into a secret form is called "encryption" and a converted document is called an "encrypted" document. Some existing techniques in the field of cryptography are described in U.S. Pat. No. 5,872,849 to Sudia, entitled "Enhanced Cryptograghic System And Method With Key Escrow Feature", and U.S. Pat. No. 5,903,652 to Mital, entitled "System And Apparatus For Monitoring Secure Information In a Computer Network."

Besides providing security, current systems also use encryption techniques to authenticate or "digitally sign" a document. While digital signatures authenticate documents, digital signatures differ significantly from hand written signatures in that a digital signature "signs" a document by encrypting a portion of the document in a unique manner.

A cryptographic communications system also ensures the integrity of data transmissions by preventing an alteration by an unauthorized party. The cryptographic communications system can further ensure the integrity and authenticity of the transmission by providing for a recognizable document-dependent digitized signature such that a particular sender cannot deny that it is the source of the transmission.

A cryptographic system involves the encoding or encrypting of digital data transmissions to render them incomprehensible by all but the intended recipient. A message is encoded numerically and then encrypted using a complex mathematical algorithm that transforms the encoded message based on a given set of numbers or digits, also known as a cipher key. The cipher key is a sequence of data bits that may either be randomly chosen or have special mathematical properties, depending on the algorithm or cryptosystem used. A sophisticated cryptographic algorithm implemented on a computer can transform and manipulate numbers that are hundreds or thousands of bits in length and can resist any known method of unauthorized decryption. There are two basic classes of cryptographic algorithms: symmetric key algorithms and asymmetric key algorithms.

A symmetric key algorithm uses an identical cipher key for both encrypting by the sender of the communication and decrypting by the receiver of the communication. A symmetric key cryptosystem is built on the mutual trust of the two parties sharing the cipher key to use the cryptosystem to protect against distrusted third parties.

The second class of cryptographic algorithms, asymmetric key algorithms, uses different cipher keys for encrypting and decrypting. In a cryptosystem using an asymmetric key algorithm, a user makes the encryption key public and keeps the decryption key private, and it is not feasible to derive the private decryption key from the public encryption key. Thus, anyone who knows the public key of a particular user could encipher a message to that user, whereas only the user who is the owner of the private key corresponding to that public key can decipher the message.

Even in the absence of problems such as fraud and misrepresentation, and given that each party is aware of the true identity of the other, a transaction in electronic commerce can often be further enhanced, and in some cases may even require, assurance of the business credentials of one or both parties. For example, a party's credentials are relevant when verifying its credit worthiness, or negotiating prices or contract terms. U.S. Pat. No. 5,809,144 to Sirbu et al., entitled "Method And Apparatus For Purchasing And Delivering Digital Goods Over A Network" describes a system in which a customer presents its credentials to a merchant by way of an encrypted transmission.

However, none of the aforementioned references describe a method or system in which the business credentials of a party are provided by an independent third party. Even if such credentials were available, none of these references describe a method or system that assists a party by evaluating the credentials of the other party in real time within the context of the underlying transaction. Furthermore, in a case where neither the identity of a corresponding party nor the identity of an organization that the party purports to represent is at issue, these references do not describe a technique for ensuring that the corresponding party is authorized to act on behalf of the identified organization.

There is a need for a system that facilitates a transaction in electronic commerce by providing information concerning the business credentials of a party to the transaction.

There is also a need for a system that evaluates the business credentials of the participants and makes a decision regarding the underlying transaction.

Additionally, there is a need for a system that verifies an affiliation between a correspondent and another entity with regard to a transaction in electronic commerce.

SUMMARY OF THE INVENTION

In accordance with a first method of the present invention, a method is provided for facilitating a transaction in electronic commerce. The method comprises the steps of identifying a first party to the transaction from a digital identifier, extracting a profile identifier of the first party from the digital identifier, and retrieving data from a database based on the profile identifier.

In accordance with a second method of the present invention, a method is provided for verifying an affiliation between a correspondent and an entity. The method comprises the steps of identifying the correspondent from a digital identifier, extracting a profile identifier from the digital identifier, and determining the entity based on the profile identifier.

In accordance with a first embodiment of the present invention, a system is provided for facilitating a transaction in electronic commerce. The system comprises a processor for identifying a first party to the transaction from a digital identifier, extracting a profile identifier of the first party from the digital identifier, retrieving data from a database based on the profile identifier.

In accordance with a second embodiment of the present invention, a system is provided for verifying an affiliation between a correspondent and an entity. The system comprises a processor for identifying the correspondent from a digital identifier, extracting a profile identifier from the digital identifier, and determining the entity based on the profile identifier.

DETAILED DESCRIPTION OF THE INVENTION

An important driver of electronic commerce will be an ability to check that a transaction is being initiated and authorized by a qualified party representing a valid and qualified business. In an open network environment, where new buyers and sellers can enter at will, a means of business authentication must evolve.

For example, a seller may be concerned with issues such as determining: (1) whether the buyer is who it claims to be, (2) whether the buyer is actually affiliated with a particular business entity, (3) whether the buyer has authority to transact business on behalf of a particular business entity, (4) whether a buyer is within the limits of its authorized purchasing power, (5) whether the buyer is eligible for a special promotion offer, and (6) whether goods should be shipped to the buyer. Each of these concerns can be addressed by evaluating the credentials of the buyer, e.g., the buyer's likelihood to buy, and ability to pay.

Likewise, the buyer needs to have a comparable sense of comfort about the credentials of the seller. The buyer may wish to determine: (1) whether the seller is who it claims to be, (2) whether the seller is authorized to sell or service the goods being represented, (3) whether the seller is likely to be in business long enough to honor a service agreement, or (4) how well the seller rates in terms of on-time delivery, product satisfaction or customer service.

Figure 1:
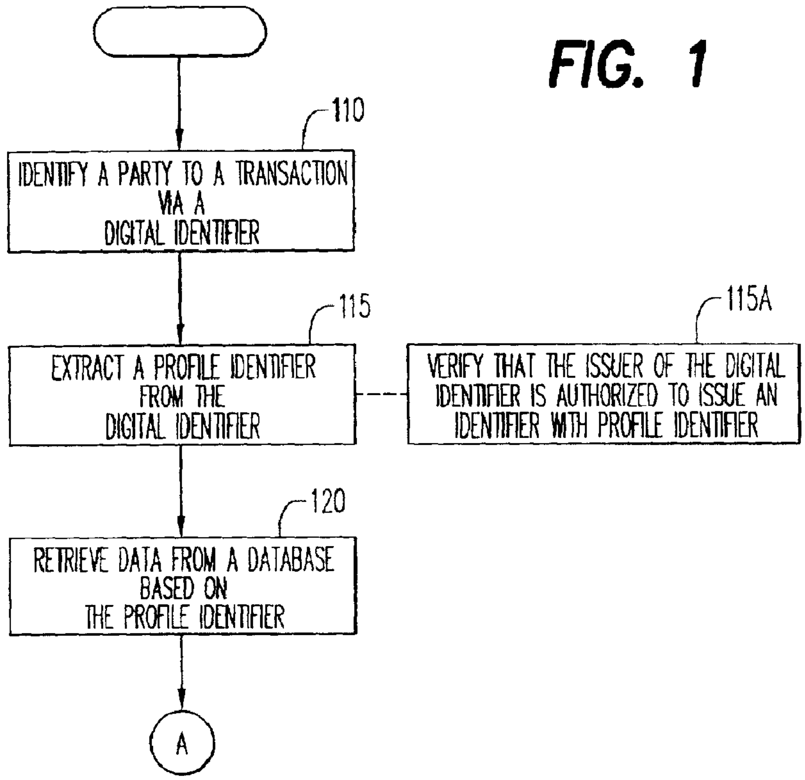
FIG. 1 is a flowchart of a method for facilitating a transaction in electronic commerce in accordance with the present invention.

FIG. 1 is a flowchart of a method for facilitating a transaction in electronic commerce in accordance with the present invention. The method allows a buyer and a seller to exchange information, such as their respective credentials, while a transaction is in progress. The method begins with step 10.

In step 110, the method identifies a first party to the transaction from a digital identifier. To complete a full transaction, the method identifies each of the parties to the transaction. The digital identifier, which is issued by an issuer of digital identifiers, can be any mechanism for identification such as a digital certificate, a smart card, a credit card, a corporate purchasing card, or a user identification with a password. A digital identifier in the form of a digital certificate, such as an X.509 v3 certificate, offers an additional advantage in that, through the use of encryption technology, it can ensure against tampering of data and abuse of identity, and further facilitate a binding transaction. The method then advances to step 115.

In step 115, the method extracts a profile identifier of the first party from the digital identifier. In a complete transaction involving multiple parties, the method extracts a profile identifier from the digital identifier of each respective party. The profile identifier, which is embedded in the digital identifier by the issuer of the digital identifier, uniquely identifies a business entity with which a party is affiliated. The method then advances to step 120.

In a preferred embodiment, the profile identifier for a business entity is a Dun & Bradstreet Data Universal Numbering System (D&B D-U-N-S®) Number. The D&B D-U-N-S® Number is an internationally recognized common company identifier that is presently recommended or endorsed by the International Standards Organization, the European Commission, the United Nations Edifact Council, the American National Standards Institute, and the U.S. Federal Government. For an individual, the profile identifier can be, for example, an electronic mail (email) address.

In step 115*a*, which is executed in cooperation with step 115, the method verifies that the issuer of the digital identifier is authorized to issue an identifier having a profile identifier embedded therein.

In step 120, the method retrieves data from a database based on the profile identifier. That is, the profile identifier is used to access a database to retrieve information about the party. In a full transaction, the method retrieves data regarding each of the parties to the transaction. For example, the D&B D-U-N-S® Number can be used to access a Dun & Bradstreet database that presently includes profiles for over 55 million businesses worldwide. In a case where the party of interest is an individual, the retrieved information can include individual rights, roles and privileges. The profile identifier can also be used to establish links to additional databases or other data sources such as, for example (1) uniform resource locator (URL) addresses, (2) digital certificate revocation lists, which are used for life-cycle management of digital certificates, (3) customer identification/account numbers within enterprises, and (4) membership/association lists of selected industry groups, standards bodies, and accrediting organizations. Optionally, the method can proceed to step 210, shown in FIG. 2.

Figure 2:
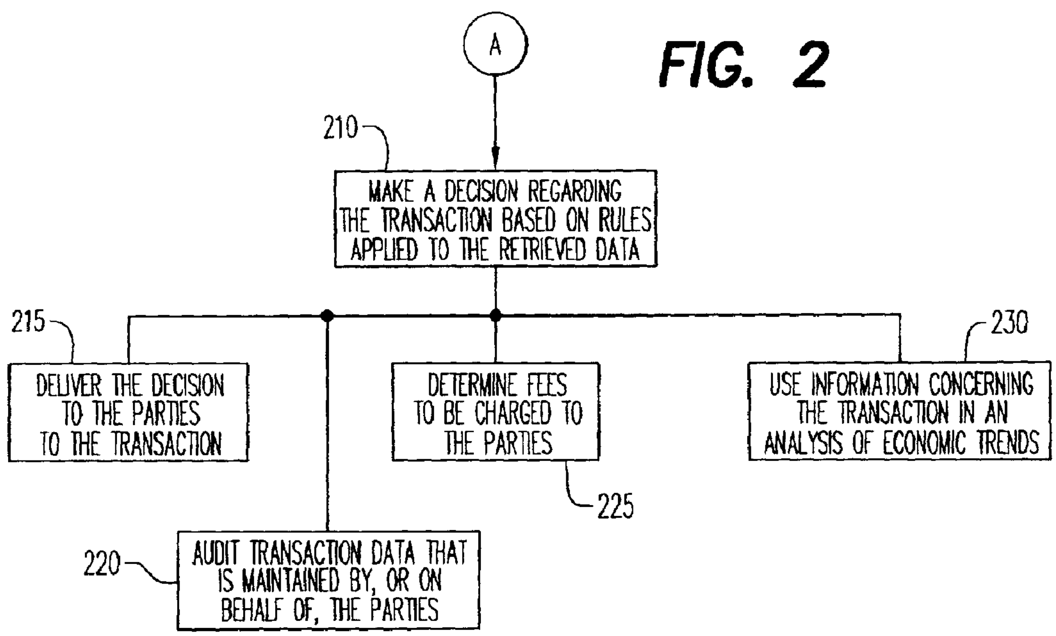
FIG. 2 is a flowchart further enhancing the method shown in FIG. 1.

FIG. 2 shows additional features that are contemplated to enhance the basic method as shown in FIG. 1. The enhancements begin with step 210.

In step 210, the method makes a decision regarding the transaction based on a rule applied to the data that was retrieved in step 120. The method utilizes a rules engine to execute business logic rules to arrive at the decision. For example, the rules can be applied to analyze the credentials of the parties and make a recommendation regarding whether the contemplated transaction should be completed. From step 210, the method can advance to any of steps 215, 220, 225 or 230, which are represented in FIG. 2 as being executed in parallel with one another.

As an example of the decision process, assume that a potential buyer has requested an extension of credit from a potential seller. The analysis provided by the rules engine may include a procedure for grading the credit worthiness of the buyer on a scale of 1 (lowest rating) to 100 (highest rating) based upon user-selected criteria. For example, the decision can be based on the following guidelines.

| Low | High | Net Worth | Action Step |
|---|---|---|---|
| 70 | 100 | ≧$1 M | Approved for $20,000. |
| | | <$1 M | Approved for $10,000. |
| 40 | 69 | ≧$1 M | Approved for $7,500. |
| | | <$1 M | Approved for $5,000. |
| 15 | 39 | ≧$1 M | Approved for $4,000. |
| | | <$1 M | Approved for $2,500. |
| 5 | 14 | ≧$2 M | Approved for $1,000. |
| | | <$2 M | Refer to Regional Credit Department. |
| 1 | 4 | ≧$2 M | Refer to Regional Credit Department. |
| | | <$2 M | Require Full Cash Payment. |

Preferably, a party can access a rules editor that allows the party to customize a rules profile in order to accommodate validation preferences or criteria that the party may wish to employ. Accordingly, prior to the step of identifying a first party (step 110), the method modifies the rule pursuant to an instruction from a second party to the transaction.

In step 215, the method delivers the decision and its associated data to at least one of the first party and a second party to the transaction. By example, a decision regarding the credit worthiness of a buyer would be delivered to a seller.

In step 220, the method audits transaction data that is maintained by, or on behalf of, at least one of the first party and a second party to the transaction. This step retrieves and audits the transaction data for billing purposes as discussed in step 225. Step 220 allows for a case where data concerning individual transactions is retained on a storage device in a facility controlled by a party to the transactions. An auditing procedure can obtain data for all of the transactions in a batch, rather than obtaining smaller quantities of data at the time of each of the individual transactions. Accordingly, this step permits the auditing system to operate more efficiently, and avoids a loss of data due to a failure in the network through which the data is transmitted.

In step 225, the method determines a fee to be charged to at least one of the first party and a second party to the transaction. Preferably, this step is executed concurrently with step 220, that is, off-line, at the time the audited transaction data is retrieved and processed. Again, by example, in the case where the method delivered a decision regarding the credit worthiness of a buyer to a seller, the method would determine a fee to be charged to the seller. The method could also determine a fee to be charged to the buyer for the service associated with evaluating the buyer's credit worthiness.

In step 230, the method uses information concerning the transaction in an analysis of an economic trend or of customer interactions. This practice, sometimes referred to as "data mining", takes advantage of the availability of information concerning individual transactions in order to recognize or predict general marketing trends. Preferably, step 230 obtains the transaction data of interest off-line, at the time of execution of step 220.

Figure 3:
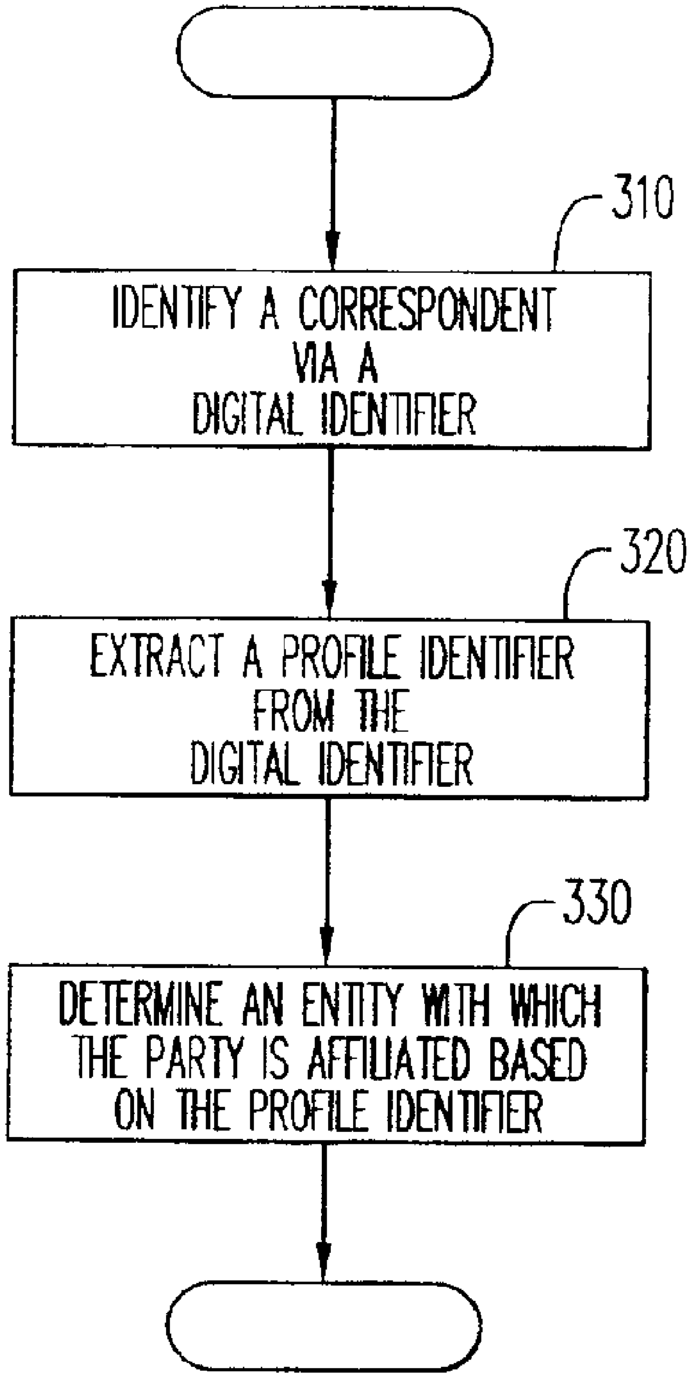
FIG. 3 is a flowchart of a method for verifying an affiliation between a correspondent and an entity in accordance with the present invention.

FIG. 3 is a flowchart of a method for verifying an affiliation between a correspondent and an entity in accordance with the present invention. For example, in a case where a buyer corresponds with a seller, and the buyer purports to be affiliated with a particular entity, the seller can apply this method to verify the purported affiliation. The method begins with step 310.

In step 310, the method identifies the correspondent from a digital identifier. As in the method described above, in the context of FIG. 1, the digital identifier can be any mechanism for identification such as a digital certificate, a smart card, a credit card, a corporate purchasing card, or a user identification with a password. The method then advances to step 320.

In step 320, the method extracts a profile identifier from the digital identifier. The method then advances to step 330.

In step 330, the method determines the entity based on the profile identifier. The D&B D-U-N-S® Number is particularly suited for use as the profile identifier in this application. This is because the D&B D-U-N-S® Number can be linked to a corporate family that includes parents, subsidiaries, headquarters and branches of a business entity. It can also be utilized to designate that a particular individual is authorized to act on behalf of a particular entity. The profile identifier for an individual, such as an email address, can be used to determine individual rights, roles and privileges.

Figure 4:
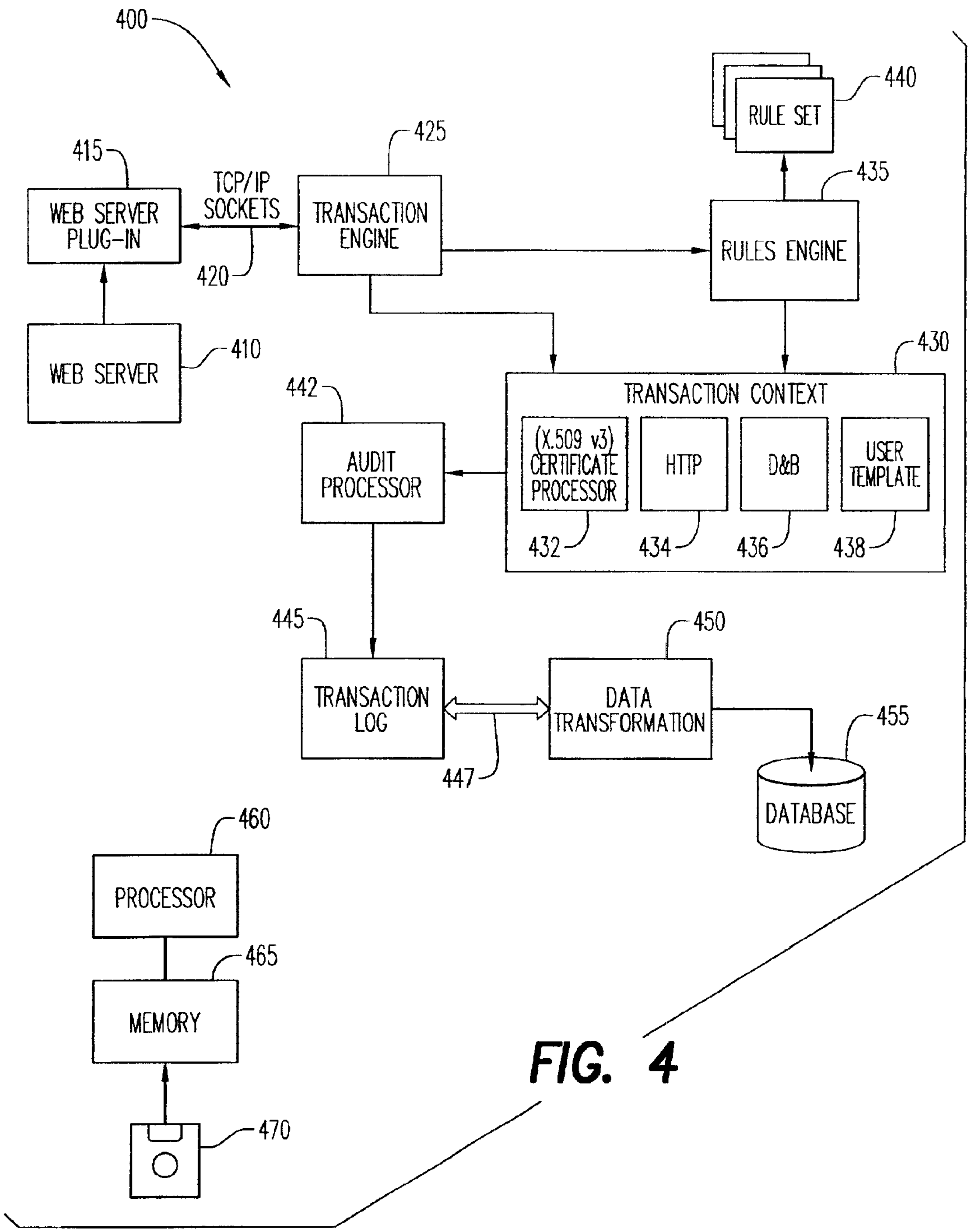
FIG. 4 is a block diagram of a computer system particularly adapted to carry out the present invention.

FIG. 4 is a block diagram of a computer system 400 particularly adapted to execute the methods described above in the context of FIGS. 1, 2 and 3. System 400 includes a web server 410, a web server plug-in 415, a transaction engine 425, a transaction context 430, a rules engine 435, a rules set 440, an audit processor 442, a transaction log 445, a data transformation 450, and a database 455. Also included is a processor 460 for the execution of instructions to perform the methods described above, and an associated memory 465 for the storage of data and instructions. While the procedures required to execute the invention hereof are indicated as already loaded into memory 465, they may be configured on a storage media, such as data memory 470, for subsequent loading into memory 465.

Web server 410 can be any conventional web server such as a Microsoft IIS web server, available from Microsoft Corporation of Redmond, Wash., or a Netscape Enterprise Server, available from Netscape Communications Corporation, Mountain View, Calif. A party, i.e., correspondent, to an electronic commerce transaction is in communication with web server 410. Web server 410 generates a request to invoke the operation of the transaction engine 425.

Web server plug-in 415, operating in cooperation with web server 410, is responsible for intercepting a hyper text transfer protocol (HTTP) stream that is part of the request, and channeling the request to transaction engine 425. Plug-in 415 is therefore a launch point for connecting web server 410 to transaction engine 425. Plug-in 415 also isolates transaction engine 425 from a variety of technologies and interfaces for the underlying web server 410.

Web server 410 invites plug-in 415 to intercept and examine an HTTP request. Plug-in 415 passes the HTTP request to transaction engine 425 for further processing by other components of system 400. During processing, the HTTP request is modified, and the modified HTTP request is returned to plug-in 415, which in turn returns the modified HTTP request to web-server 410. Web server 410 acts in accordance with the modified HTTP request. For example, the HTTP request can be modified such that a target URL embedded within the HTTP request is changed to point to a specific application that performs a function in support of the transaction. Accordingly, web server 410 is redirected to the specific application. All parts of the HTTP request can be affected by rules engine 435, which has the ability to add, change or remove parts of the HTTP request.

To determine which requests to channel to transaction engine 425, plug-in 415 is configured to filter a particular set of uniform resource locators (URL's). A URL is an address of a file (resource) that is accessible on the Internet. A list of URL's is provided to plug-in 425 during an initialization stage and URL's are also specified using user-written rules. Plug-in 415 examines an incoming HTTP request, extracts a target URL from the HTTP request, compares the target URL with those in the list of URL's, and invokes transaction engine 425 only when a match is found. Each URL is provided in the form of a regular expression, which can specify one or more portions of the URL as being subjected to a comparison. Thus, a single URL pattern may match more than one URL.

Plug-in 415 communicates with transaction engine 425 via TCP/IP sockets 420. Accordingly, a connection between plug-in 415 and transaction engine 425 could be made across a computer network such as the Internet. Each request that arrives at web server 410 opens a new socket to transaction engine 425. The use of standard TCP/IP socket communication allows web server 410 and transaction engine 425 to be configured to run on different machines, although this is not a requirement. This architecture also allows traffic to be load balanced across multiple transaction engines 425. Also, if web server 410 and transaction engine 425 are running on different machines, it is possible to allow multiple web servers 410 to be configured to communicate with a single transaction engine 425.

Transaction engine 425 is coupled to plug-in 415, rules engine 435 and transaction context 430. Transaction engine 425 is the main controller of system 400. As the controller, it orchestrates both the initialization of system 400 and the interconnection between subsystems. Transaction engine 425 also provides a transaction engine interface through TCP/IP sockets 420 as described above, and it acts as a dispatcher for the requests. Transaction engine 425 also produces objects that are input to rules engine 435, as described below.

Some of the exchanges between plug-in 415 and transaction engine 425 are described in the following paragraphs.

Configuration: Transaction engine 425 provides a list of URL's to be filtered by plug-in 415. That is, transaction engine 425 provides access to the list of URL's that plug-in 415 will intercept.

Retrieve Server Certificate: Plug-in 415 supplies a server certificate from web server 410 to transaction engine 425 during configuration.

Run-time: System 400 validates a transaction based on a URL and Certificate for an HTTP request. As a result of validating the transaction, the HTTP stream may be modified on return to web server 410. The possible modifications include: (1) adding a transaction number that can be used for tracking and billing, (2) redirecting a URL, that is, the destination for the HTTP request may be redirected to a different URL, and (3) modifying the HTTP Stream in accordance with user-configurable rules.

Transaction context 430, which is coupled to transaction engine 425, rules engine 435 and audit processor 442, maintains a life-cycle and state of each transaction processed by system 400. When a transaction is processed, instances of various processing objects are created. The following processing objects are maintained by this component: (1) certificate processor 432, (2) HTTP data 434, (3) Dun and Bradstreet data 436, and (4) user template data 438. System 400 makes decisions on the progress of a transaction based on applying rules to information input from various data sources available during transaction processing.

Certificate processor 432 processes information relating to the digital certificate and the profile identifier extracted from the certificate. The certificate is retrieved by plug-in 415 and passed on to transaction server 425 for validation. Certificate processor 432 uses standard certificate validation mechanisms, such as those included in the Java™ 2 library, for validating the certificate against a certificate revocation list (CRL). Java™ is a trademark of Sun Microsystems, Inc., 901 San Antonio Road, Palo Alto, Calif. 94303 USA. The actual validation may be performed by a $3^{rd}$ party vendor interface such as ValiCert, Inc., 1215 Terra Bella Avenue, Mountain View, Calif. 94043 USA.

Certificate processor 432 identifies a party to a transaction from a digital identifier and extracts a profile identifier from the digital identifier. Based on the profile identifier, it is also capable of determining whether the party is affiliated with another entity such as a particular corporation. The digital identifier can be implemented in any convenient form, such as a digital certificate, a smart card, a credit card, a corporate purchasing card, or a user identification with a password. In a preferred embodiment, the digital identifier is a digital certificate such as an X.509 v3 certificate, and the profile identifier is a D&B D-U-N-S® Number or an email address.

Certificate processor 432 performs several checks to validate the digital certificate. For example, it checks that the certificate is issued by a recognized Certificate Authority, it determines whether the certificate has been revoked from its purported owner, and it checks the expiration date of the certificate to determine whether the certificate is currently valid. Certificate processor 432 also verifies that the issuer of the digital certificate is authorized to issue a certificate having a profile identifier embedded therein.

In addition to providing validation, certificate processor 432 provides access to certificate information needed by other subsystems. The information supplied may include a D&B D-U-N-S® Number, user name, company, address, expiration date, and certificate authority.

Plug-in 415 pass HTTP data 434 to transaction engine 425. This data identifies a destination URL. HTTP data 434 also provides an interface to update a URL if a different destination URL is selected by rules engine 435. A transaction number is inserted into the HTTP data 434 for auditing and tracking.

Dun and Bradstreet data 436 provides information on the credit worthiness of the parties to a transaction. The D&B D-U-N-S® Number extracted from the certificate is used to lookup the Dun and Bradstreet data.

User template data 438 is a user-defined data source that allows a user to define variables that are used during evaluation of a rule by rules engine 435. More than one user template may exist. The values of the variables in a user-defined template may be modified at run-time through a configuration tool, which effectively allows a user to enter values for the fields in a form. This arrangement enables modification of a rule pursuant to an instruction from a party through a rules editor interface. Variables defined in the user template may parameterize rules. Rules engine 435 can change the value of a variable during run-time of system 400. For example, a certain class of customers in a transaction may be entitled to a discount of 10% in the morning, 20% in the afternoon and 5% in the evening.

Rules engine 435 is coupled to transaction engine 425, transaction context 430, and rules set 440. It makes a decision regarding a transaction based on a rule applied to data that has been retrieved from database 455, as described below. The decision is delivered to a party to the transaction via web server 410. The rule is obtained from rules set 440. Rules engine 435 may have one or many rule sets 440 loaded simultaneously.

Rules set 440, which is coupled to rules engine 435, contains one or more business rules. Each rule has a conditional clause composed of a set of conditions and an action clause composed of a sequence of actions. An "else" clause, which may also be included, is composed of a sequence of actions to be executed if the conditional clause is false.

Audit processor 442 is coupled to transaction context 430 and transaction log 445. Audit processor 442 determines a fee to be charged to at least one of the parties to the transaction, and it is also capable of auditing transaction data that is maintained by, or on behalf of, the parties. Additionally, audit processor 442 can use information concerning the transaction in an analysis of an economic trend or of customer interactions. The action taken by audit processor is preferably performed off-line rather than at the time of each of the individual transactions.

Transaction log 445, which is coupled to audit processor 442 and data transformation 450, contains audit information related to the transaction. Included in the audit information will be data extracted from the certificate processor 432, the HTTP data 434 and the Dun & Bradstreet data 436.

Data transformation 450 is coupled between, and provides an interface between, transaction log 445 and database 455. Given a profile identifier, such as a D&B D-U-N-S® Number or an email address, database transformation 450 retrieves data from database 455 and returns the data to the other components of system 400 via transaction log 445. Preferably, data transformation 450 is remotely located from transaction log 445 and is coupled thereto via a computer network 447, such as the Internet.

Database 455 is coupled to data transformation 450. It contains profile information, that is, information regarding the profile of various businesses, which is evaluated and applied by system 400 when making a decision regarding a transaction in electronic commerce. Database 455 also includes information regarding whether an individual is affiliated with an entity such as a particular corporation.

Those skilled in the art, having the benefit of the teachings of the present invention may impart numerous modifications thereto. Such modifications are to be construed as lying within the scope of the present invention, as defined by the appended claims.

What is claimed is:

1. A method for facilitating a transaction in electronic commerce between a first party and at least one second party, the method comprising the steps of:

determining the identity of said first party to said transaction from a digital identifier comprising a profile identifier embedded in said digital identifier;

extracting said embedded profile identifier of said first party from said digital identifier;

retrieving data comprising business information identified by said extracted profile identifier concerning said first party from a third-party database comprising business information concerning a plurality of businesses, the retrieved business information comprising business credentials including credit worthiness of said first party, and/or business confidence in said first party, and/or business authority of said first party; and recommending in dependence on said business credentials whether or not said contemplated transaction should be completed.

2. The method of claim 1, wherein said step of recommending further comprises applying at least one rule to said business information.

3. The method of claim 2, further comprising, prior to the step of determining, a step of modifying said rule pursuant to an instruction from said second party to said transaction.

4. The method of claim 1, further comprising a step of delivering said recommendation to at least one of said first party and second party to said transaction.

5. The method of claim 1, further comprising a step of auditing transaction data that is maintained by, or on behalf of, at least one of said first party and said second party to said transaction.

6. The method of claim 1, further comprising a step of determining a fee to be charged to at least one of said first party and said second party to said transaction.

7. The method of claim 1, further comprising a step of using information concerning said transaction in an analysis of an economic trend.

8. The method of claim 1 wherein said recommending further comprises deciding whether or not the second party should extend credit to said first party.

9. The method of claim 1 wherein said digital identifier comprising said profile identifier is cryptographically tamper-proof and cryptographically authenticated by an issuer.

10. The method of claim 9, further comprising a step of verifying that said digital identifier is issued by an issuer authorized to issue digital certificates having said profile identifier embedded therein.

11. The method of claim 1 wherein a profile identifier comprises a Dun & Bradstreet Universal Numbering System number, and wherein said third party database comprises the Dun & Bradstreet worldwide business database.

12. The method of claim 1 wherein said retrieved business information further comprises the commercial affiliations of said first party, and further comprising a step of verifying an affiliation between said first party and a further business entity based on said retrieved data.

13. The method of claim 12 wherein a commercial affiliation is selected from the group consisting of a parent, a subsidiary, a headquarters, a branch, and a relationship of agency or authority.

14. A system for facilitating a transaction in electronic commerce between a first party and at least one second party, the system comprising: a processor and coupled memory, wherein the memory comprises instructions for causing the processor to determine the identity of said first party transaction from a digital identifier comprising a profile identifier embedded in said digital identifier;

extract said embedded profile identifier of said first party from said digital identifier;

retrieving data comprising business information identified by said extracted profile identifier concerning said first party from a third-party database comprising business information concerning a plurality of businesses, the retrieved business information comprising business credentials including credit worthiness of said first party, and/or business confidence in said first party, and/or business authority of said first party; and recommend in dependence on said business credentials whether or not said contemplated transaction should be completed.

15. The system of claim 14, wherein said recommending further comprises applying at least one rule to said business information.

16. The system of claim 15, wherein said processor further modifies said rule pursuant to an instruction from said second party to said transaction.

17. The system of claim 14, wherein said processor further delivers said recommendation to at least one of said first party and said second party to said transaction.

18. The system of claim 14, wherein said processor further audits transaction data that is maintained by, or on behalf of, at least one of said first party and said second party to said transaction.

19. The system of claim 14, wherein said processor further determines a fee to be charged to at least one of said first party and said second party to said transaction.

20. The system of claim 14, wherein said processor further uses information concerning said transaction in an analysis of an economic trend.

21. The system of claim 14 wherein said processor further recommends whether or not the second party should extend credit to said first party.

22. The system of claim 14 wherein said digital identifier comprising said profile identifier is cryptographically tamper-proof and cryptographically authenticated by an issuer.

23. The system of claim 22, wherein said processor further verifies that said digital identifier is issued by an issuer authorized to issue digital certificates having a profile identifier embedded therein.

24. The system of claim 14 wherein a profile identifier comprises a Dun & Bradstreet Universal Numbering System number, and wherein said third party database comprises the Dun & Bradstreet worldwide business database.

25. The system of claim 14 wherein said retrieved business information further comprises the commercial affiliations of said first party, and wherein said processor further verifies an affiliation between said first party and a further business entity based on said retrieved data.

26. The system of claim 25 wherein a commercial affiliation is selected from the group consisting of a corporate parent, a corporate subsidiary, a corporate headquarters, a branch, and a relationship of agency or authority.

27. A computer-readable storage media for facilitating a transaction in electronic commerce between a first party and at least one second party, said storage media comprising instructions for causing a processor to determine the identity of said first party to said transaction from a digital identifier comprising a profile identifier embedded in said digital identifier;

extract said embedded profile identifier of said first party from said digital identifier;

retrieving data comprising business information identified by said extracted profile identifier concerning said first party from a third-party database comprising business information concerning a plurality of businesses, the retrieved business information comprising business credentials including credit worthiness of said first party, and/or business confidence in said first party, and/or business authority of said first party; and recommend in dependence on said business credentials whether or not said contemplated transaction should be completed.

28. The storage media of claim 27, wherein said recommending further comprises applying at least one rule to said business information.

29. The storage media of claim 28, further comprising instructions for causing said processor to modify said rule pursuant to an instruction from said second party to said transaction.

30. The storage media of claim 27, further comprising instructions for causing said processor to deliver said recommendation to at least one of said first party and said second party to said transaction.

31. The storage media of claim 27, further comprising instructions for causing said processor to audit transaction data that is maintained by, or on behalf of, at least one of said first party and said second party to said transaction.

32. The storage media of claim 27, further comprising instructions for causing said processor to determine a fee to be charged to at least one of said first party and said second party to said transaction.

33. The storage media of claim 27, further comprising instructions for causing said processor to use information concerning said transaction in an analysis of an economic trend.

34. The storage medium of claim 27 further comprising instructions for causing said processor to recommend whether or not the second party should extend credit to said first party.

35. The storage medium of claim 27 wherein said digital identifier comprising said profile identifier is cryptographically tamper-proof and cryptographically authenticated by an issuer.

36. The storage media of claim 35, further comprising instructions for causing said processor to verify that said digital identifier is issued by an issuer authorized to issue digital certificates having a profile identifier embedded therein.

37. The storage media of claim 27 wherein a profile identifier comprises a Dun & Bradstreet Universal Numbering System number, and wherein said third party database comprises the Dun & Bradstreet worldwide business database.

38. The storage media of claim 27 wherein said retrieved business information further comprises the commercial affiliations of said first party, and further comprising instructions for causing said processor to verify an affiliation between said first party and a further business entity based on said retrieved data.

39. The storage media of claim 38 wherein a commercial affiliation is selected from the group consisting of a corporate parent, a corporate subsidiary, a corporate headquarters, a branch, and a relationship of agency or authority.

40. A computer-implemented method for facilitating a contemplated transaction in electronic commerce between two or more business entities represented by parties, the method comprising:

exchanging digital identifiers between said representing parties, each digital identifier comprising profile identifier data of the originating party, each profile identifier uniquely identifying business information that describes the originating party in a database of business information, the business information database being available from an independent third party;

retrieving business information identified by at least one of said profile identifiers from said third party database, said retrieved information comprising business credentials of the representing parties, the business credentials including credit worthiness of, and/or business confidence in, and/or business authority of the representing parties and/or the represented business entities; and determining in dependence on said retrieved business credentials that at least one of the representing parties is authorized to act for the represented business entity in said contemplated transaction and/or that at least one of the representing parties is credit worthy; and recommending in dependence on said determinations to at least one of the representing parties whether or not said contemplated transaction should be completed.

41. The method of claim 40 wherein said profile identifier comprises a Dun & Bradstreet Universal Numbering System number, and wherein said third party database comprises the Dun & Bradstreet worldwide business database.

42. The method of claim 40 wherein said retrieved business information further comprises commercial affiliations of said representing parties and/or business entities, and further comprising a step of verifying an affiliation between at least one representing party and at least one represented business entity.

43. The method of claim 42 where a commercial affiliation is selected from the group consisting of a parent, a subsidiary, a headquarters, a branch, and a relationship of agency or authority.

44. The method of claim 40 wherein said determining confirms that the same identities are indicated in the digital identifier exchanged by a party and in the retrieved business information concerning the party.

45. The method of claim 40 wherein said determining confirms that a party has the authority to enter into the contemplated transaction.

46. The method of claim 40 wherein said determining confirms that a representing party and/or represented business entity is capable of performing the contemplated transaction.

47. The method of claim 40 wherein said determining confirms the business record of and/or business confidence in a representing party and/or represented business entity is capable of performing the contemplated transaction.

48. The method of claim 40 wherein said recommending further comprises applying one or more business rules to the retrieved business information, wherein at least one business rule comprises one or more conditions and a sequence of one or more actions.

49. The method of claim 40 wherein said steps of exchanging, retrieving, determining, and recommended are performed for all representing parties participating in said contemplated transaction.

* * * * *